United States Patent [19]

Williams

[11] 4,414,341
[45] Nov. 8, 1983

[54] FLASH EVAPORATION PROCESS FOR CONCENTRATING POLYMER SOLUTIONS

[75] Inventor: Albert G. Williams, West Orange, N.J.

[73] Assignee: Celanese Corporation, New York, N.Y.

[21] Appl. No.: 208,202

[22] Filed: Nov. 19, 1980

[51] Int. Cl.[3] ........................... C08J 3/00; C08L 67/00
[52] U.S. Cl. .................................... 523/340; 106/198; 524/924; 528/501
[58] Field of Search ...................... 260/34.2; 106/198; 528/501; 523/340, 343; 524/924

[56] References Cited

U.S. PATENT DOCUMENTS

| | | | |
|---|---|---|---|
| 3,201,365 | 8/1965 | Charlesworth et al. | 526/352 |
| 3,453,184 | 7/1969 | Gemassmer et al. | 203/88 |
| 3,493,470 | 2/1970 | Irvin | 528/501 |
| 3,634,300 | 1/1972 | Fischer et al. | 523/343 |
| 3,635,917 | 1/1972 | Roth et al. | 528/501 |
| 3,668,161 | 6/1972 | Nauman et al. | 528/501 |
| 4,255,314 | 3/1981 | Miyoshi et al. | 528/501 |

Primary Examiner—Allan Lieberman
Attorney, Agent, or Firm—Burns, Doane, Swecker & Mathis

[57] ABSTRACT

A continuous process for concentrating polymer solutions, particularly solutions of halogenated aromatic polyesters in methylene chloride, is provided. The polymer solutions, are first passed through a heating zone where they are heated to a temperature of not less than the temperature at which the solvent thereof evaporates. The heated solution is then passed through an orifice or a multiplicity of orifices (such as a spinneret) located in an evaporation chamber containing a saturated atmosphere of solvent vapor which is maintained within specifically defined temperature limits where flash evaporation of the solvent takes place in the absence of the formation of polymer gels or skins. The polymer solutions are concentrated to a final concentration higher than the initial polymer solution concentration.

32 Claims, 1 Drawing Figure

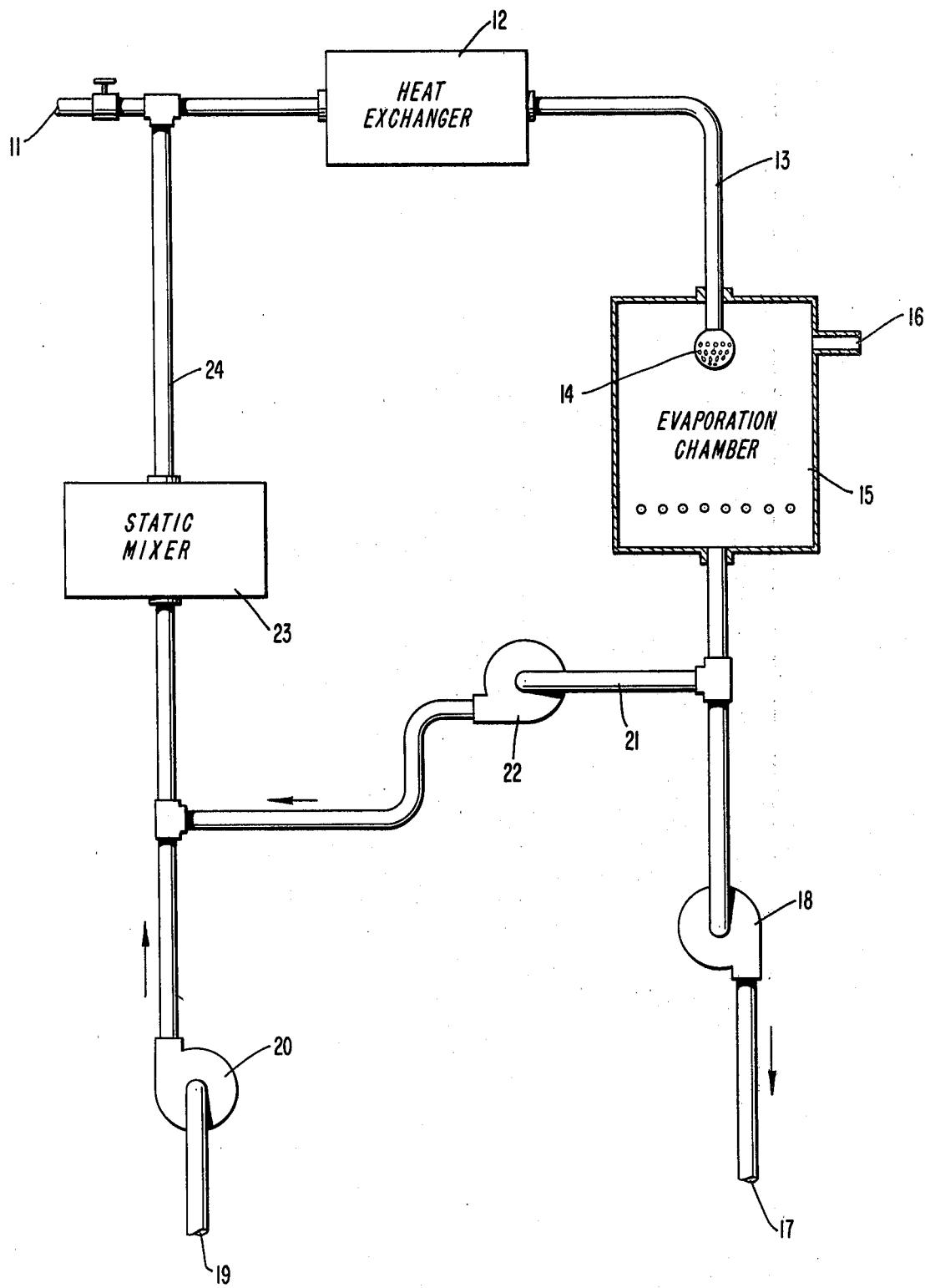

FLASH EVAPORATION PROCESS FOR CONCENTRATING POLYMER SOLUTIONS

BACKGROUND OF THE INVENTION

Typically, when a polymer is prepared by techniques such as solution polymerization, it is present in relatively dilute concentrations for ease of handling. Subsequent processing techniques to which the polymer solution will eventually be subjected such as dry-spinning, however, necessitate that the polymer be concentrated.

For example, when halogenated aromatic polyesters, such as the condensation products of 4,4'-isopropylidene-2,2', 6,6'-tetrachlorodiphenol or 4,4'-isopropylidene-2,2',6,6'-tetrabromodiphenol with isophthalic acid and/or terephthalic acid or the ester forming derivatives thereof, are prepared by the solution polymerization technique as described, for example, in U.S. Pat. No. 3,234,167, and as described herein, the final polymer solution after neutralization and removal of the acid acceptor, contains approximately 10% by weight polymer and about 3 to 5%, by weight, water in methylene chloride. This solution is too dilute for direct spinning so the polymer solution must be concentrated to about 20%, by weight, polymer.

A continuous method for neutralizing excess tertiary amine acid acceptor is disclosed in U.S. Pat. No. 4,322,521, entitled "Improved Process for Producing Halogenated Aromatic Polyesters," by Albert G. Williams. A continuous countercurrent extraction method for removing tertiary amine hydrochloride from the polymer solution is disclosed in U.S. Pat. No. 4,360,662, entitled "Continuous Countercurrent Extraction Process for Removing Water-Soluble Impurities From Water Immiscible Polymer Solutions" and filed concurrently herewith, by Albert G. Williams. The disclosures of each of the above-identified patent applications are hereby incorporated by reference.

It would be advantageous to develop a continuous method for concentrating halogenated aromatic polyester solutions, and polymer solutions generally, so that the entire process for preparing such polymer solutions from polymerization through spinning could be carried out on a continuous basis and in a manner sufficient to avoid the cost of precipitation, drying, solvent recovery and handling thereof.

One problem involved in attempting to concentrate a polymer solution, such as a 10% polymer solution of a halogenated aromatic polyester, to a more concentrated solution, such as a 20% solution, is the formation of polymer gels or "skins" on the surface of the polymer due to the poor diffusion/evaporation balance which exists therein. Also, such a polymer solution has a high viscosity (a 10% solution has a viscosity of from about 50 to about 100 poise, and a 20% polymer solution has a viscosity of from about 1000 to about 3000 poise) and notoriously low heat transfer coefficients thereby requiring large equipment and high capital outlay.

The search has continued for continuous methods for concentrating a polymer solution while avoiding the above-discussed problems of the prior art. The present invention was made as a result of this search.

OBJECTS AND SUMMARY OF THE INVENTION

Accordingly, a general object of the present invention is to avoid or substantially alleviate the above problems of the prior art.

A more specific object of the present invention is to provide a process for concentrating a polymer solution so that the concentrated polymer solution might be useful for the direct spinning of a fiber.

Another object of the present invention is to provide a process for concentrating a polymer solution without the formation of polymer gels or skins.

Still another object of the present invention is to provide a continuous process for concentrating a solution of halogenated aromatic polyester so that the entire process from polymerization through spinning might be carried out on a continuous and economically efficient basis.

Other objects and advantages of the invention will become apparent from the following summary and description of the preferred embodiments of the present invention.

The present invention provides a continuous process for concentrating and reducing polymer gel formation of a polymer solution wherein the solvent thereof has a boiling point below the decomposition temperature of the polymer comprising:

(a) heating the polymer solution to a temperature of not less than the temperature at which the solvent thereof evaporates in the evaporation zone of (b) by passing the solution through a heating zone;

(b) passing the heated polymer solution of (a) from the heating zone through at least one orifice located in an evaporation zone, said evaporation zone containing a saturated atmosphere of the vapor of the solvent of the polymer solution at a temperature of not greater than the temperature of the polymer solution after it exits the heating zone and not greater than the boiling point of the vapor at the pressure present within the evaporation zone; and (c) optionally admixing a part of said concentrated polymer solution of (b) with the unconcentrated polymer solution of (a) prior to passage of the resulting mixture through the heating zone.

BRIEF DESCRIPTION OF THE DRAWING

The drawing is a schematic presentation of an apparatus arrangement capable of carrying out the process of the present invention.

DESCRIPTION OF THE PREFERRED EMBODIMENT

The present invention is directed to a process for concentrating polymer solutions. The initial concentration of the polymer solution will, from a practical standpoint, generally depend on the particular method used to prepare the polymer and can therefore vary within a wide range of possible concentrations. A typical polymerization technique which results in a solution of the polymer includes the solution polymerization method.

Alternatively, one may wish to dissolve a solid polymer in excess solvent to form a dilute solution which is subsequently concentrated, since the more concentrated the solution prepared directly from a solid polymer, the more difficult if is to dissolve the polymer.

Regardless of the source of the polymer solution the present invention can be employed to increase the concentration of any polymer dissolved in a suitable solvent which has a boiling point below the decomposition temperature of the polymer.

The final concentration to which the polymer solution is raised will depend on the processing techniques to which the polymer solution will be subjected.

For example, when the polymer solution is to be directly spun into fibers the final concentration will be selected in such a manner that the overall balance of polymer solution properties renders it suitable for such techniques. For fiber spinning, such factors as solvent identity and intrinsic viscosity of the polymer, will affect the selection of the final concentration of the polymer solution. For instance, as the intrinsic viscosity of the polymer increases, the target concentration to which the polymer solution is adjusted will decrease. Conversely, as the intrinsic viscosity of the polymer decreases the target concentration of the polymer solution will increase. The intrinsic viscosity of the polymer cannot be too low, however, otherwise the fiber properties would suffer.

The above discussion is provided merely to illustrate that there may be many factors which interact in selecting the target polymer concentration and that the present invention can be employed to achieve whatever increased concentration is finally selected relative to the initial concentration.

Subject to the above considerations the polymer solutions which can be concentrated by the present invention will generally have the polymer dissolved therein at an initial concentration of generally from about 5 to about 50, typically from about 3 to about 25, and preferably from about 2 to about 15%, by weight, based on the weight of the polymer solution. Correspondingly, the polymer will be present in the final concentrated polymer solution in an amount of from about 8 to about 60, typically from about 10 to about 40, and most preferably from about 15 to about 30%, by weight, based on the weight of the polymer solution.

When the polymer is the halogenated aromatic polyester of the type described herein and the solvent is methylene chloride, the final polymer concentration will be selected for purposes of dry-spinning to be from about 15 to about 30, typically from about 17 to about 27, and preferably from about 18 to about 25%, by weight, based on the weight of the polymer solution.

When the polymer is the condensation product of tetrabromobisphenol A and from about 45 to about 75% by weight isophthaloyl chloride and correspondingly from about 55 to about 25% by weight terephthaloyl chloride having an intrinsic viscosity of about 1.2 dl/gm. as determined from a 0.1% (w/w) mixture of phenol/trichlorophenol and the solvent is methylene chloride, the preferred final polymer solution concentration for purposes of dry-spinning is between about 19 and about 22%, (e.g., about 20 and about 21%), by weight, thereof.

Representative examples of polymer solutions which may be concentrated by the present invention include cellulose acetate polymer dissolved in acetone or a mixture of acetone and water, cellulose triacetate polymer dissolved in methylene chloride or a mixture of methylene chloride and methanol, polyacrylonitrile dissolved in dimethyl formamide or dimethyl acetamide, and polyvinyl chloride/vinylidene chloride dissolved in acetone.

The present invention is particularly useful in concentrating halogenated aromatic polyester solutions.

Preferred halogenated aromatic polyesters have recurring units of the structural formula:

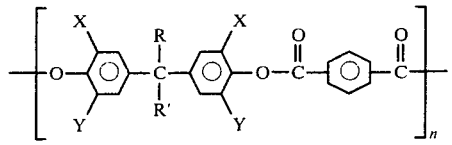

wherein X, which may be the same or different, may be chlorine or bromine, Y, which may be the same or different, may be hydrogen, chlorine, or bromine, R and R' may be the same or different and represent lower alkyl groups (e.g., having from 1 to about 5 carbon atoms), hydrogen, or together constitute a cyclic hydrocarbon group, and n equals at least 10 (e.g., n equals about 40 to 400, typically about 50). Commonly the aromatic polyester utilized in accordance with the process of this invention has a chlorine and/or bromine content of about 15 to about 60%, by weight, based upon the weight of the aromatic polyester (e.g., a chlorine and/or bromine content of about 25 to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula are prepared by reacting substantially equimolar amounts of (1) an appropriate bisphenol, and (2) a diacid halide such as isophthaloyl chloride, terephthaloyl chloride, or mixtures thereof by solution polymerization.

Initially the appropriate bisphenol is dissolved in a suitable solvent. The catalyst or acid acceptor is also dissolved in the solvent prior to the addition of the diacid halide.

The bisphenols which are useful in the preparation of the polyesters having recurring units of the formula illustrated above have the structure:

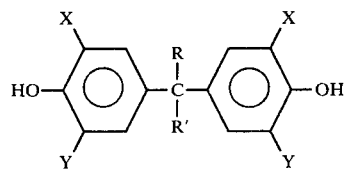

where X, Y, R and R' have the same significance as set forth hereinabove. Suitable bisphenols which are useful in the practice of this invention include bis(3,5-dibromo-4-hydroxyphenyl)methane; bis(3,5-dichloro-4-hydroxyphenyl)methane; bis(3-chloro-5-bromo-4-hydroxyphenyl)methane; 1,1-bis(3,5-dibromo-4-hydroxyphenyl)ethane; 1,1-bis-(3,5-dichloro-4-hydroxyphenyl)ethane; 1,1-bis-(3-chloro-5-bromo-4-hydroxyphenyl)ethane; 1,1-bis-(3,5-dibromo-4-hydroxyphenyl)-propane; 1,1-bis-(3,5-dichloro-4-hydroxyphenyl)propane; 1,1-bis-(3-chloro-5-bromo-4-hydroxyphenyl)propane; 2,2-bis-(3,5-dibromo-4-hydroxyphenyl)propane; 2,2-bis-(3,5-dichloro-4-hydroxyphenyl)propane; 2,2-bis-(3-chloro-5-bromo-4-hydroxyphenyl)-propane; bis-(3-bromo-4-hydroxyphenyl)methane; bis-(3-chloro-4- hydroxyphenyl)methane; 3-bromo-3'-chloro-bis(4-hydroxyphenyl)-methane; 1,1-bis-(3-bromo-4-hydroxyphenyl)ethane; 1,1-bis-(3-chloro-4-hydroxylphenyl)ethane; 3-bromo-3'-chloro-bis-(4,4'-hydroxyphenyl)ethane; 1,1'-bis-(3-bromo-4-hydroxyphenyl)-propane; 1,1'-bis(3-chloro-4-hydroxyphenyl)propane; 1,1'-(3-chloro-3'-bromo-bis-[4,4'-hydroxyphenyl])propane; 2,2'-bis(3-bromo-4-hydroxyphenyl)propane; 2,2'-bis-(3-chloro-4-hydroxyphenyl)propane; 2,2'-(3-bromo-3'-chloro-bis[4,4'-hydroxyphenyl])-propane; as well as their alkali metal salts.

Preferred bisphenols are 2,2-bis-(3,5-dibromo-4-hydroxyphenyl)propane, also known as tetrabromobisphenol A, and 2,2-bis-(3,5-dichloro-4-hydroxyphenyl)-propane, also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

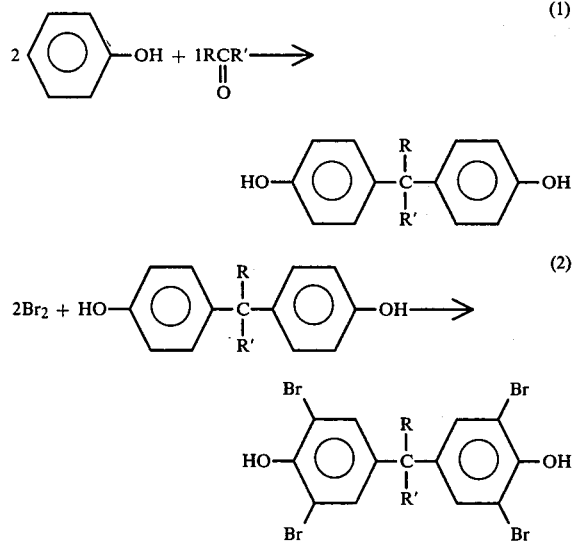

The solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Suitable solvents which may be utilized in the solution polymerization technique described herein include chloroalkanes and aromatic and chloroaromatic compounds. Examples of such compounds include methylene chloride, chloroform, tetrachloroethane, trichloroethane, chlorobenzene, chlorotoluene, dichloroethane, benzene, toluene, and xylene.

The catalyst or acid acceptor is preferably a tertiary amine which is capable of undergoing a reaction with the bisphenol to form a complex salt. The bisphenol complex salt subsequently reacts with the daicid halide and liberates an amine halide.

Stoichiometric amounts of the bisphenol and the catalyst would require a ratio of the tertiary amine to the bisphenol of about 2:1. However, it has been found that in order for the reaction to proceed at a commercially acceptable rate, an excess of acid acceptor should be employed. The amount of excess acid acceptor is generally less than about 50, typically less than about 20, and preferably less that about 5%, by weight, based upon the stoichiometric amount of acid acceptor required. The upper limit of acid acceptor is not critical. However, it should be remembered that excess amounts of acid acceptor must be neutralized and the reaction product of the neutralization reaction must be separated from the final polymer product.

Representative examples of suitable tertiary amine catalysts or acid acceptors include triethylamine, diamino-2,2,2,bicyclo octane, tripropyl amine, dimethyl aniline, pyridine, dimethyl and benzyl amine. Triethylamine is a preferred acid acceptor.

It will be noted that halogenated aromatic polyesters are prepared by the condensation of bisphenols with the diacid halides of isophthalic acid, terephthalic acid or mixtures thereof. The use of a diacid halide as opposed to other corresponding derivatives is critical, the direct preparation of polymers from bisphenols and free acids being normally not possible. These acid halides may be derived from the corresponding dicarboxylic acid by any one of several methods well known in the art such as by reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical, the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of from about 45 to about 75% (e.g., 60%) by weight isophthaloyl chloride and correspondingly from about 55 to about 25% (e.g., 40%) by weight terephthaloyl chloride.

In preparing a preferred chlorinated aromatic polyester, the diacid halide will generally be utilized as an aromatic acid chloride mixture of from about 90 to about 40%, and preferably from about 80 to about 60% (e.g., 70%) by weight isophthaloyl chloride and correspondingly from about 10 to about 60% and preferably from about 20 to about 40% (e.g., 30%) by weight terephthaloyl chloride.

For smooth operation in a stirred solution, the resulting polymer product preferably should be about 10% or less on the basis of the total weight of the solvent although percentages as high as 25% may be utilized depending upon the molecular weights of the polymer.

Generally substantially stoichiometric amounts of each reactant are employed. Typical molar amounts of from about 1:0.9:0.1 to about 1:0.4:0.6, of the ratio of bisphenol, isophthaloyl chloride, and terephthaloyl chloride, respectively, may be utilized when preparing a chlorinated aromatic polyester. Typical molar amounts of from about 1:0.45:0.55 to about 1:0.75:0.25 of the ratio of bisphenol, isophthaloyl chloride, and terephthaloyl chloride, respectively, may also be utilized when preparing a brominated aromatic polyester.

Polymerization of the halogenated aromatic polyesters may be carried out in a batch, semi-continuous, or continuous manner, as desired. However, the polymerization reaction is preferably carried out in a continuous manner, by which the reactants are continuously introduced into the reaction zone and the polymer product is continuously prepared and withdrawn. This may be achieved, for example, by utilizing a cylindrical tube, having static mixers as a reaction vessel. The bisphenol containing solution is passed through the tube while adding the diacid halide at various points along the longitudinal axis of the tube. Thus, the diacid halide is added in large amounts at the upstream portion of the tube and in gradually decreasing amounts at positions further downstream in the tube.

The final concentration of the polymer in solution is from about 3 to about 25, typically from about 5 to about 20 and preferably from about 7 to about 15% by weight of the total reaction mixture. At these concentrations, the solution viscosity will generally vary from about 1 to about 3000 poise, typically from about 5 to about 2000 poise, and preferably from about 10 to about 1000 poise.

Polymerization is effected at temperatures which may vary from about 0 to about 200, typically from about 10 to about 100, and preferably from about 15° to about 50° C., and at corresponding autogenous pressures which are due to the vapor pressure of the solvent at the aforenoted temperatures which may vary from about 0.2 to about 26, typically from about 0.3 to about 4.8, and preferably from about 0.4 to about 1.4, atmospheres.

Agitation of the reactants should be sufficient to evenly disperse the diacid halide throughout the bisphenol containing solution to avoid a build-up of the concentration of the diacid halide in a localized area within the reaction mixture. Such agitation may be supplied by any of the standard means of mixing such as by stirrer, shaker, static mixer, spray nozzle or other flow agitating systems.

The present process typically employs reaction times of generally from about 0.1 to about 20, typically from about 1 to about 10, and preferably from about 2 to about 6, hours when conducted on a batch basis. Polymerization conducted on a continuous basis will typically employ shorter polymerization times depending on the degree of mixing.

After polymerization, the polymer may be recovered by admixing with the polymer containing solution either an aqueous solution of hydrochloric acid, or, in a preferred embodiment, gaseous, substantially anhydrous, hydrogen chloride to neutralize the excess acid acceptor. The use of gaseous, substantially anhydrous, hydrogen chloride to neutralize the acid acceptor is disclosed in U.S. Pat. No. 4,322,521, entitled "Improved Process for Producing Halogenated Aromatic Polyesters" by Albert G. Williams.

The amount of hydrogen chloride added to the polymer containing solution should be sufficient to completely neutralize the excess, uncombined tertiary amine and thus is dependent upon the amount of excess tertiary amine initially added. The gaseous hydrogen chloride may be added to the polymer containing solution by any means known to those skilled in the art. For example, the gaseous hydrogen chloride may be added using a gas sparge.

Reaction of the hydrogen chloride with the tertiary amine to form a tertiary amine hydrochloride takes place substantially immediately (i.e., as soon as the hydrogen chloride gas is dissolved in the polymer containing solution). This rapid neutralization of the tertiary amine is commercially advantageous since other neutralization methods, which involve the addition of aqueous hydrochloric acid, require much longer neutralization times because of the existence of a two-phase system. To some extent, the long neutralization times involved when an aqueous solution is employed, can be remedied by adding a large excess of hydrogen chloride, but this is disadvantageous because (1) it introduces further impurities (the excess hydrogen chloride) into the polymer containing solvent, and (2) the addition of more aqueous hydrochloric acid involves the further dilution of the tertiary amine hydrochloride product and makes this product more difficult to recover.

Besides the time advantages resulting from the use of gaseous, substantially anhydrous, hydrogen chloride instead of an aqueous solution of hydrochloric acid, there is the further advantage that much smaller amounts of hydrogen chloride may be introduced into the reaction system when the anhydrous method is employed. Thus, there is less waste of hydrogen chloride as well as reduced environmental dangers.

The gaseous hydrogen chloride should be substantially anhydrous. Small amounts of water may be introduced into the system but, to the extent water is introduced, one encounters to that extent the various problems described hereinabove.

After neutralization of the tertiary amine, with hydrogen chloride, the resulting tertiary amine hydrochloride is removed from the polymer containing solution. This may be accomplished by multiple batch extraction with water or by employing the continuous countercurrent extraction method disclosed in U.S. Pat. No. 4,360,662, entitled "Continuous Countercurrent Extraction Process for Removing Water Soluble Impurities From Water Immiscible Polymer Solutions", by Albert G. Williams. The disclosure of this patent application is hereby incorporated by reference.

After removal of the water-soluble impurities, the halogenated aromatic polyester is concentrated without isolation by the flash evaporation process described herein and thereafter processed for shaping, e.g., spun or cast for making fibers or film respectively.

The continuous process for concentrating a polymer solution of the present invention is discussed with reference to the figure.

The first step in the process comprises passing the polymer solution through conduit (11) to heating zone (12) to heat the polymer solution.

The temperature of this heating zone is dependent in part on the identity of the solvent which is present in the polymer solution. Such temperatures are selected in a manner sufficient to heat the polymer solution to not less than the temperature at which the solvent evaporates at a given pressure present within the evaporation chamber into which it is subsequently introduced. The evaporation step relies on the mechanism wherein the energy absorbed by the polymer solution during the heating step is preserved by maintaining a back pressure on the polymer solution to prevent vaporization of the solvent in conduit (13), and is subsequently released in the evaporation chamber causing evaporation of the solvent. Consequently, the greater the temperature differential between the heated polymer solution and the solvent vapor in the evaporation chamber (which is at a temperature of at least its boiling point at a given pressure), the faster will be the rate of evaporation.

The temperatures to which the polymer solution is heated will vary from about 20 to about 300, typically from about 35 to about 290 and preferably from about 50° to about 190° C.

When the polymer solvent is methylene chloride and the polymer is a halogenated aromatic polyester of the type described herein the temperature of the polymer solution should be raised to from about 38.5 to about 200, preferably from about 50 to about 190 (e.g., 50 to 175), and most preferably from about 170° to about 190° C. It is appropriate to mention that when such polymers are prepared by solution polymerization using methylene chloride, a minor amount of water will be present in the polymer solution in which case an azeotropic mixture forms which boils at a temperature below the boiling point of methylene chloride alone.

The particular temperature selected from the above ranges will depend in part on the concentration of the polymer solution being heated. The concentration of the heating polymer solution in turn may vary from its initial concentration depending on whether it is recycled after concentration and combined with fresh unconcentrated polymer solution. Thus, if the polymer solution is to be concentrated in a single pass through the evaporation chamber the polymer solution will be heated to higher temperatures than would be required when concentrated polymer solution is mixed with the more dilute fresh polymer solution. This results from the fact that the mixture of the concentrated and dilute polymer solutions has a polymer concentration higher than the dilute polymer solution alone. Consequently, there is less solvent to evaporate from the mixture and the amount of energy per unit weight of feed stream in the heat exchanger which must be imparted to the polymer solution during this stage which will eventually be used to evaporate the solvent is reduced.

The pressure at which flash evaporation will be conducted also affects the temperature to which the polymer solution must be heated. Thus, as the pressure is decreased in the evaporation zone the temperature to which the polymer solution is heated by the heat exchanger can also be reduced. Although sub-atmospheric and supra-atmospheric pressures can be employed in the evaporation zone it is preferred to conduct the flash evaporation at atmospheric pressure for economic reasons.

When the polymer solution is heated to a sufficient temperature, it is then passed through a conduit (13) to orifice (14) which is located inside of an evaporation zone of evaporation chamber (15). The design and size of orifice (14) are not particularly critical. For example, a spinneret or other multi-orifice device known to those skilled in this art may be used. The purpose of the orifice is to control the exposure of the hot polymer solution to the relatively cool solvent vapor which is within the second chamber and to control the pressure in the feed and heating system (11), (12), (13) to prevent vapor formation therein.

A multi-orifice device is preferred, particularly when the polymer solution is to be concentrated in a single pass through the evaporation zone. Selection of the number and size of the orifices is used to achieve the desired pressure to prevent boiling in the feed (12) and heating (13) sections prior to entering the evaporation chamber as described above. Such back pressure, as described above, is necessary to prevent boiling of the polymer solution in conduit (13) prior to entering the evaporation chamber. Moreover, a multi-orifice device increases the surface area of the polymer solution as it enters the evaporation chamber which increases the rate of evaporation therefrom while decreasing the foaming and vapor entrapment associated therewith.

A single large orifice permits a rapid dissipation of the back pressure which causes the polymer solution to foam as it enters the evaporation chamber and also allows foaming to occur in conduit (13) as well as in heat exchanger (12). Therefore if a single orifice is employed a valve should be inserted in conduit (13) to maintain sufficient back pressure to eliminate vaporization of the solvent in the heat exchanger.

The vapor in the evaporation chamber preferably comprises the solvent in which the polymer is dissolved in vapor form although any vapor which is a solvent or diluent which would not precipitate the polymer from solution and has a boiling point which is not greater than the boiling point of the solvent of the polymer solution may be employed.

The pressure in the evaporation chamber is preferably atmospheric pressure although sub-atmospheric and supra-atmospheric pressures may be employed. Solvent vapor can therefore be obtained at temperatures much higher than the atmospheric boiling point of the solvent. When a solvent vapor above its atmospheric boiling point is employed, exit orifice (16) would be valved to regulate the evaporation chamber pressure. When the pressure in the evaporation chamber is atmospheric, exit orifice (16) can serve as a vent for solvent vapor which is forced out of the evaporation chamber by the evaporating solvent. When sub-atmospheric pressures are employed in the evaporation chamber, orifice (16) can be connected to a suitable vacuum source.

Thus, the evaporation chamber is equipped with a means for regulating the pressure therein to achieve the selected solvent vapor temperature and to avoid a build up of the evaporating solvent.

The amount of the solvent vapor in the evaporation chamber is typically that amount sufficient to saturate the atmosphere within the evaporation chamber.

The temperature of the vapor in the evaporation chamber is (1) not greater than, preferably lower than, the temperature of the polymer solution after it exits the heat exchanger, and (2) not greater than the boiling point of the vapor at the pressure present within the evaporation chamber.

Thus, in those instances when the solvent of the polymer solution forms an azeotropic mixture which boils below the atmospheric boiling point of the solvent alone which mixture can therefore be heated to a temperature below the boiling point of the solvent alone and yet still achieve evaporation, the temperature of the vapor within the evaporation chamber is not more than the boiling point of the azeotrope.

Generally, such temperatures should be from about 10 to about 200, preferably from about 15 to about 180, and most preferably from about 20° to about 150° C. less than the temperature of the heated polymer solution subject to the limits described above.

The temperature of the solvent vapor at atmospheric pressure is the boiling point of the solvent.

For example, when methylene chloride is the solvent and the polymer is a halogenated aromatic polyester of the type described herein, the temperature of the vapor within the evaporation zone or chamber at atmospheric, sub-atmospheric and supra-atmospheric pressures is generally controlled to be from about 20 to about 60, typically from about 30 to about 50, and preferably from about 40° to about 45° C. (e.g., 40° C.). The vapor temperature may be controlled by any means known to those skilled in the art.

When the hot polymer solution passes through the orifice flash evaporation of the solvent takes place.

Although it is expected that flash evaporation of solutions of polymers such as halogenated aromatic polyesters which are heated to temperatures of from about 38.5° to about 200° C. would normally produce polymer gels or skins, it has been found that essentially no polymer gel or skin formation takes place during the present process. Although I do not wish to be bound by any particular theory, it appears that the reason that gel or skin formation is avoided during the process of the present invention is because the present process employs a controlled evaporation.

Polymer gels or skins are believed to form when the rate of solvent evaporation exceeds the diffusion rate of the solvent within the polymer solution to the surface thereof. This causes a disproportionate increase in the concentration of the polymer at the surface of the polymer solution, or at the point of heat application. Consequently, as evaporation proceeds a hard skin or gel forms which collapses as the volume of the polymer solution shrinks imparting a gelled appearance to the final solution which is not dissipated by mixing thereof.

In the present process, the rate of evaporation from the polymer surface is reduced by the presence of the solvent vapor in the evaporation chamber, the high surface area provided, and the decreased distance the solvent must diffuse to reach the evaporative surface. This permits the rate of diffusion of solvent to the polymer solution surface to reach equilibrium with the rate of solvent evaporation thereby avoiding build-up of the polymer at the polymer solution surface and reducing the associated creation of gels or skins.

The polymer solution which is removed from the evaporation zone has a concentration as described herein.

The concentrated polymer solution is removed from the evaporation zone through orifice (17) with the aid of pump (18) and then optionally filtered. The concentrated filtered polymer solution may then be sent to a spinning column for spinning into fibers or to a storage tank for later use.

In a preferred embodiment of the present invention, some of the concentrated polymer solution may be mixed with some of the original polymer solution in any mixing apparatus known to those skilled in the art to provide a polymer solution having a concentration intermediate between the starting and final concentration as discussed above. A preferred mixing apparatus is a static mixer such as a Kenics static mixer.

For example, when the polymer solution is of a halogenated aromatic polyester in methylene chloride, the concentrated solution after a single pass can contain about 20% by weight polymer while the fresh unconcentrated, halogenated aromatic polyester solution contains about 10% by weight polymer. When various amounts of these two polymer solutions are mixed, a polymer solution is prepared which has a polymer concentration between about 10 and about 20% by weight depending upon the ratio of concentrated to unconcentrated, polymer solutions which are mixed.

The advantage of the mixing of this concentrated polymer solution with the fresh unconcentrated solution, as described above, is that decreasingly lower temperatures may be employed in the heating zone at increasingly higher polymer concentrations of the polymer solution. The temperature required in the heating zone is inversely proportional to the concentration of polymer in the polymer solution. Thus, the larger the amount of concentrated polymer solution added to fresh polymer solution, the lower the temperature required in the heating zone. The use of lower temperatures in the heating zone permits the present process to be used to concentrate polymer solutions which are unstable at the higher temperatures required in the single pass embodiment. For example, when the original polymer solution comprises about 10% halogenated aromatic polyester in methylene chloride, the temperature of the heating zone should be between about 170° and 190° C. (e.g., 168° and 187° C.) to achieve a final polymer solution concentration of about 19 to about 22%, by weight, in a single pass. However, when sufficient concentrated halogenated aromatic polyester (e.g., about 20% by weight) is added to the 10% material, the temperature of this heat exchanger may be much lower. Thus, if sufficient concentrated halogenated aromatic polyester is added to the unconcentrated (10% by weight) polymer solution to give the combined polymer solution a concentration of about 15% by weight, the temperature to which the mixed polymer solution should be heated need only be between about 100° and 125° C. to achieve similar concentrations.

When this preferred embodiment of the present invention is employed, the valve of conduit (11) is closed and the polymer solution to be concentrated is passed through conduit (19) with the aid of pump (20). Part of the concentrated polymer solution is diverted from the exit orifice of the evaporation chamber through conduit (21) with the aid of a metering pump (22), e.g., a gear pump wherein the speed is controlled. The concentrated and unconcentrated polymer solutions are mixed in static mixer (23) and passed through conduit (24) into the heating zone (12) and the proportions of recycle to fresh feed solution is adjusted until the desired concentration of the final polymer solution is achieved.

The following example is given as a specific illustration of the claimed invention. It should be understood, however, that the invention is not limited to the specific details set forth in the examples. All parts and percentages in the examples as well as the remainder of the specification are by weight unless otherwise specified.

EXAMPLE 1

201.7 parts by weight tetrabromobisphenol A, 45.2 parts by weight isophthaloyl chloride and 30.1 parts by weight of terephthaloyl chloride are reacted to form a brominated aromatic polyester in the presence of about 2600 parts by weight methylene chloride solvent and 77.3 parts by weight of triethylamine acid acceptor.

The contents of the reaction zone are heated at atmospheric pressure at about 40° C. with agitation for 3 hours.

When the reaction is complete, substantially anhydrous hydrogen chloride is bubbled through a gas sparge into the solution for five minutes until the excess triethylamine is neutralized, as determined by measuring the pH of the solution. The excess triethylamine is neutralized when the pH is reduced to below about 3.0. The pH is measured by determining the pH of the water layer of a mixture which is prepared by mixing 50% by weight reaction solution with 50% by weight distilled water.

The reaction mixture is then washed with water until a pH of 6 is achieved thereby removing the triethyl amine hydrochloride. A portion of the resulting brominated polyester is recovered by precipitation with methanol and has an inherent viscosity as determined from a 0.1% solution of the polymer in a 10/7 (w/w) mixture of phenol/trichlorophenol at 25° C., of 0.8 dl/gm.

The remainder of the halogenated aromatic polyester is present in methylene chloride at a concentration of about 9.97%, by weight polymer, based upon the total weight of the polymer solution. This polymer solution is then treated in accordance with the present invention as illustrated in the Figure.

The 9.97% by weight solution is passed through conduit (11) and into a commercial shell & tube heat exchanger (12) which is at a temperature of 107° C. The polymer solution leaving the heat exchanger is at a temperature of 105° C. It leaves through conduit (13) and passes through a typical dry or wet spinning spinneret (14) having 50 holes and each hole having a diameter of 76 microns located in evaporation chamber (15) which contains a saturated atmosphere of methylene chloride at its boiling point (i.e., about 40° C.). In this evaporation chamber, flash evaporation of the methylene chloride takes place and the polymer solution becomes more concentrated.

When the pressure of the solvent vapor becomes too great within the evaporation chamber, some of the vapor leaves the chamber through exit orifice (16). The final polymer concentration of the polymer solution is 12.7% by weight thereof.

The process conditions are summarized in Table I. As may be seen from the data of Example 1, the final product has a higher concentration of polymer than the initial polymer concentration. Moreover, no gels or skins are observed in the final product.

EXAMPLES 2-4

Example 1 is repeated in Examples 2-4 with the exception that the feed concentration, feed rate to the heat exchanger, the spinnerette used, and the temperature of the heat exchanger is varied as indicated in Table I. The appropriate process conditions and final product concentrations are summarized in Table I. As may be seen from the results of Examples 2-4, the final polymer solution concentration is higher than the initial concentration. Moreover, no gels or skins are observed in each of the final products.

EXAMPLES 5-11

Example 1 is repeated on a continuous basis to show that a product of substantially uniform concentration is obtained. The results are summarized as Examples 5 through 11. The appropriate process conditions and final product concentrations are summarized at Table 1. As may be seen from results of Examples 5-11, the final product concentration is substantially uniform at 20.6±0.2%, by weight, based on the weight of the polymer solution. Moreover, no gels or skins are observed in the final product.

TABLE I

| Example No. | Spinneret Jet Holes | Jet Hole diameter (μ) | Dope Conc. in Conduit 19 (%) | Dope Temp. Entering Heat Exchanger (°C.) | Dope Feed Rate Through Heat Exchanger (lbs/hr) |
|---|---|---|---|---|---|
| 1 | 50 | 76 | 9.97 | 25 | 38.6 |
| 2 | 50 | 76 | 9.97 | 25 | 56.9 |
| 3 | 100 | 100 | 10.0 | 25 | 62.5 |
| 4 | 100 | 100 | 13.0 | 25 | 56.5 |
| 5 | 156 | 100 | 16.2 | 25 | 58.7 |
| 6 | 156 | 100 | 16.2 | 25 | 58.8 |
| 7 | 156 | 100 | 16.2 | 25 | 58.6 |
| 8 | 156 | 100 | 16.2 | 25 | 58.7 |
| 9 | 156 | 100 | 16.2 | 25 | 57.9 |
| 10 | 156 | 100 | 16.2 | 25 | 58.5 |
| 11 | 156 | 100 | 16.2 | 25 | 59.4 |

| Example No. | Residence Time of Dope in Heat Exchanger 12 (sec.) | Temp. of Heat Exchanger 12 (°C.) | Dope Temp. in Conduit 13 (°C.) | Vapor Temp. in Evaporation Chamber (°C.) | Final Dope Conc. from Conduit 17 (%) |
|---|---|---|---|---|---|
| 1 | 65 | 107 | 105 | 40 | 12.7 |
| 2 | 44 | 107 | 100 | 40 | 12.6 |
| 3 | 40 | 140 | 118 | 40 | 14.1 |
| 4 | 44 | 140 | 121 | 40 | 18.6 |
| 5 | 43 | 105 | 97 | 40 | 20.4 |
| 6 | 43 | 107 | 99 | 40 | 20.6 |
| 7 | 43 | 110 | 102 | 40 | 20.6 |
| 8 | 43 | 110 | 102 | 40 | 20.7 |
| 9 | 43 | 110 | 102 | 40 | 20.7 |
| 10 | 43 | 110 | 101 | 40 | 20.8 |
| 11 | 42 | 110 | 102 | 40 | 20.8 |

EXAMPLE 12

Examples 1 is repeated using an initial polymer solution concentration of 10.2% by weight thereof which is fed to the system via conduit (19) rather than conduit (11) which has its valve closed. The 10.2% feed is passed through the heat exchanger which is at a temperature of 106° C. and concentrated to 13.2%. The feed rate of the 10.2% polymer solution to the heat exchanger is 65.7 lbs/hr and the product take-off rate is 50.8 lbs/hr. The temperature of the polymer solution entering the heat exchanger in conduit (24) is 25° C. and the temperature of the solution leaving the heat exchanger in conduit (13) is 101° C.

In run 2, the 13.2% polymer solution leaving the evaporation chamber is recycled through conduit (21) and pump (22) until a feed rate of 65.7 lbs./hour is established leaving pump (22). At this time the concentration of the polymer solution in conduit (21) is 15.2%. Fresh unconcentrated solution (10.2%) travelling at a feed rate of 65.7 lbs/hour is mixed with the 65.7 lbs/hr. of recycled (15.2%) solution in the static mixer (13). The feed rate through the heat exchanger is therefore raised to 131.4 lb/hour thereby reducing the residence time in the heat exchanger. The concentration of the mixed polymer solution entering the heat exchanger is 12.7% by weight thereof. The temperature of the polymer solution in conduit (24) is 29° C. The temperature of the mixed polymer solution after it exits the heat exchanger in conduit (13) is 84° C. which is 17° C. lower than without recycle. Product is now withdrawn at 15.2% polymer concentration at a rate of 44.1 lbs/hr.

In run 3 the product removal is discontinued until the recycle rate from the evaporation chamber through conduit (21) and pump (22) reaches 130.8 lbs/hr. Fresh unconcentrated feed from conduit (19) via pump (20) at 64.5 lbs/hr is mixed with the recycle solution in static mixer (13) and fed to the heat exchanger (12). When equilibrium is established, product is withdrawn at a rate of 39.2 lbs/hr at a concentration of 17%.

In run 4 the product removal is discontinued until the recycle rate is three times the rate of fresh unconcentrated solution (10.2%) feed. At equilibrium 33.8 lbs/hr of product are withdrawn. The solution at this time contains 19.5% polymer by weight.

Runs 5 and 6 demonstrate that by increasing the recycle to four or five times the unconcentrated solution feed rate while withdrawing the same amount of product at 19.5% polymer concentration, the temperature in conduit (13) can be reduced even further.

The results and appropriate process conditions are summarized in Table II as Runs 1 to 6.

This Example illustrates that the polymer solution can be heated to relatively low temperatures and still achieve the concentrating effect by using the recycle embodiment of the present invention. This embodiment is particularly advantageous when the polymer solution is unstable at higher temperatures. This Example further illustrates that the final concentration of the product can be increased substantially at a fixed unconcentrated polymer solution feed rate by increasing the recycle feed rate ratio of the concentrated and unconcentrated polymer solutions. Moreover, no gels or skins are observed in the final product.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A continuous process for concentrating a polymer solution having a polymer concentration of from about 5 to about 50% by weight in the substantial absence of gel formation wherein the solvent thereof has a boiling point below the decomposition temperature of the polymer comprising:
    (a) heating the polymer solution to a temperature of not less than the temperature at which the solvent thereof evaporates in the evaporation zone of (b), which temperature is in the range of from about 20° to about 300° C., by passing the solution through a heating zone;
    (b) passing the heated polymer solution of (a) from the heating zone through at least one orifice located in an evaporation zone, said evaporation zone containing prior to passage of the polymer solution therein a saturated atmosphere of the vapor of the solvent of the polymer solution at a temperature not greater than the temperature of the polymer solution after it exits the heating zone and not greater than the boiling point of the vapor at the pressure present within the evaporation zone, to thereby produce a polymer solution having a final concentration of from about 8 to about 60% by weight polymer, based upon the total weight of the polymer solution; and
    (c) optionally admixing a part of said concentrated polymer solution of (b) with the unconcentrated polymer solution of (a) prior to passage of the resulting mixture through the heating zone.

2. The process of claim 1 wherein part of the concentrated polymer solution of (b) is mixed with the unconcentrated polymer solution of (a) prior to passage through the heating zone.

TABLE II

| Run No. | Fresh Dope Conc. Entering Conduit 19 (%) | Conc. of Dope in Conduit 21 (%) | Fresh Dope Feed Rate from Pump 20 (lbs/hr) | Feed Rate of Recycling Dope from Pump 22 (lbs/hr) | Feed Rate of Dope to Heat Exchanger (lbs/hr) | Residence Time of Dope in Heat Exchanger (sec.) |
|---|---|---|---|---|---|---|
| 1 | 10.2 | NA | 65.7 | NA | 65.7 | 38 |
| 2 | 10.2 | 15.2 | 65.7 | 65.7 | 131.4 | 19 |
| 3 | 10.2 | 17.0 | 65.4 | 130.8 | 196.2 | 13 |
| 4 | 10.2 | 19.5 | 64.5 | 193.5 | 258.0 | 10 |
| 5 | 10.2 | 19.5 | 64.5 | 258.0 | 322.5 | 8 |
| 6 | 10.2 | 19.5 | 64.5 | 322.5 | 387.0 | 6 |

| Run No. | Conc. of Dope in Conduit 24 (%) | Temp. of Dope in Conduit 24 (°C.) | Temp. of Dope in Conduit 13 (°C.) | Vapor Take-off Rate from Conduit 16 (lbs/hr) | Product Take-off Rate from Conduit 17 (lbs/hr) | Product Conc. from Conduit 17 (%) |
|---|---|---|---|---|---|---|
| 1 | 10.2 | 25 | 101 | 14.9 | 50.8 | 13.2 |
| 2 | 12.7 | 29 | 84 | 21.6 | 44.1 | 15.2 |
| 3 | 14.7 | 33 | 75.7 | 26.2 | 39.2 | 17.0 |
| 4 | 17.2 | 35.5 | 71.9 | 30.8 | 33.8 | 19.5 |
| 5 | 17.6 | 37.0 | 65.6 | 30.8 | 33.8 | 19.5 |
| 6 | 18.0 | 37.5 | 61.3 | 30.8 | 33.8 | 19.5 |

NA = not applicable
Note:
1. Steam temperature in heat exchanger (12) is constant at 106° C.
2. Vapor and product streams (16) and (17) respectively have evaporation chamber at 40° C.

3. The process of claim 1 wherein the polymer solution comprises a solution of a halogenated aromatic polyester in methylene chloride.

4. The process of claim 1 wherein the temperature of the vapor in the evaporation zone is from about 10° to about 200° C. less than the temperature of the heated polymer solution of (a).

5. The process of claim 1 wherein the polymer solution is selected from the group consisting of cellulose acetate polymer dissolved in acetone or a mixture of acetone and water, cellulose triacetate polymer dissolved in methylene chloride or a mixture of methylene chloride and methanol, polyvinylacrylonitrile dissolved in dimethyl formamide or dimethyl acetamide, and polyvinyl chloride/vinylidene chloride dissolved in acetone.

6. The process of claim 1 wherein the polymer of the solution is a halogenated aromatic polyester which is the product of tetrabromobisphenol A and a mixture of from about 55 to about 25% by weight terephthaloyl chloride and from about 45 to about 75% by weight isophthaloyl chloride dissolved in methylene chloride.

7. A continuous process for concentrating, in the substantial absence of gel formation, a solution of a halogenated aromatic polyester wherein the solvent thereof has a boiling point below the decomposition temperature of the polymer and having the recurring structural formula:

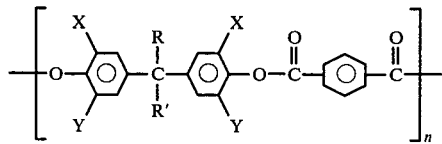

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, having an initial polymer concentration of from about 3 to about 25% by weight comprising:
  (a) heating the polymer solution to a temperature of not less than the temperature at which the solvent thereof evaporates in the evaporation zone of (b), which temperature is in the range of from about 20° to about 300° C., by passing the solution through a heating zone;
  (b) passing the heated polymer solution of (a) from the heating zone through at least one orifice located in an evaporation zone, said evaporation zone containing prior to passage of the polymer solution therein a saturated atmosphere of the vapor of the solvent of the polymer solution at a temperature not greater than the temperature of the polymer solution after it exits the heating zone and not greater than the boiling point of the vapor at the pressure present within the evaporation zone; to thereby produce a polymer solution having a final concentration of from about 8 to about 60% by weight polymer, based upon the total weight of the polymer solution; and
  (c) optionally admixing a part of said concentrated polymer solution of (b) with the unconcentrated polymer solution of (a) prior to passage of the resulting mixture through the heating zone.

8. The process of claim 7 wherein the halogenated aromatic polyester is dissolved in a solvent selected from the group consisting of methylene chloride, chloroform, tetrachloroethane, trichloroethane, chlorobenzene, chlorotoluene, dichloroethane, benzene, toluene, xylene and mixtures thereof.

9. The process of claim 8 wherein the polymer solution is heated to a temperature at about 50° to about 190° C., the temperature of the solvent vapor in the evaporation zone is the boiling point of the solvent, and the pressure within the evaporation zone is atmospheric.

10. The process of claim 7 wherein said halogenated aromatic polyester of the recurring structural formula is a product of tetrabromobisphenol A and a mixture of about 45 to 75% by weight isophthaloyl chloride and correspondingly about 55 to about 25% by weight terephthaloyl chloride.

11. The process of claim 7 wherein said halogenated aromatic polyester of the recurring structural formula is a product of tetrabromobisphenol A and a mixture of about 60% by weight isophthaloyl chloride and correspondingly about 40% by weight terephthaloyl chloride.

12. The process of claim 7 wherein said halogenated aromatic polyester of the recurring structural formula is a product of tetrachlorobisphenol A and a mixture of about 90 to about 40% by weight isophthaloyl chloride and correspondingly about 10 to about 40% by weight terephthaloyl chloride.

13. The process of claim 7 wherein said halogenated aromatic polyester of the recurring structural formula is a product of tetrachlorobisphenol A and a mixture of about 70% by weight isophthaloyl chloride and correspondingly about 30% by weight terephthaloyl chloride.

14. The process of claim 7 wherein R and R' may contain from 1 to 5 carbon atoms and wherein n may be from about 40 to about 400.

15. A continuous process for concentrating, in the substantial absence of gel formation, a solution of a halogenated aromatic polyester of the recurring structural formula:

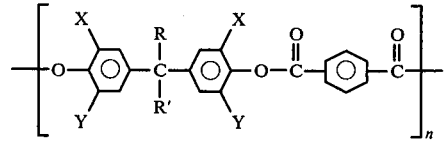

where X may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, dissolved in methylene chloride and having an initial polymer concentration of from about 3 to about 25% by weight comprising:
  (a) heating the polymer solution to a temperature at which the solvent evaporates in the evaporation zone of (b) of from about 38.5° to about 200° C. by passing the solution through a heating zone; and
  (b) passing the heated polymer solution of (a) through at least one orifice located in an evaporation zone, said evaporation zone containing prior to passage of the polymer solution therein a saturated atmosphere of methylene chloride vapor at a temperature of from about 20° to about 60° C., said evaporation zone having a means for regulating the pressure therein in a manner sufficient to achieve the selected solvent vapor temperature to produce a solution of the halogenated aromatic polyester having a final concentration of from about 15 to about 30%, by weight polymer, based upon the total weight of the polymer solution.

16. The process of claim 15 wherein said halogenated aromatic polyester of the recurring structural formula is a product of tetrabromobisphenol A and a mixture of about 45 to about 75% by weight isophthaloyl chloride and correspondingly about 55 to about 25% by weight terephthaloyl chloride.

17. The process of claim 15 wherein said halogenated aromatic polyester of the recurring structural formula is a product of tetrabromobisphenol A and a mixture of about 60% by weight isophthaloyl chloride and correspondingly about 40% by weight terephthaloyl chloride.

18. The process of claim 15 wherein said halogenated aromatic polyester of the recurring structural formula is a product of tetrachlorobisphenol A and a mixture of about 90 to about 40% by weight isophthaloyl chloride and correspondingly about 10 to about 40% by weight terephthaloyl chloride.

19. The process of claim 15 wherein said halogenated aromatic polyester of the recurring structural formula is a product of tetrachlorobisphenol A and a mixture of about 70% by weight isophthaloyl chloride and correspondingly about 30% by weight terephthaloyl chloride.

20. The process of claim 15 wherein R and R' may contain from 1 to about 5 carbon atoms and wherein n may be from about 40 to about 400.

21. The process of claim 15 wherein part of the concentrated solution of the halogenated aromatic polyester solution of (b) is mixed with the unconcentrated solution of (a), prior to passage of said mixture through the heating zone.

22. A continuous process for concentrating, in the substantial absence of gel formation, a solution of a halogenated aromatic polyester of the recurring structural formula:

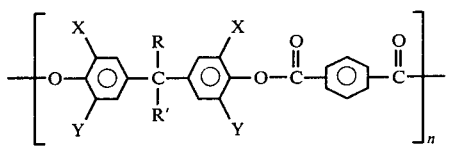

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n equals at least 10, dissolved in methylene chloride having an initial polymer concentration from about 3 to about 25% by weight comprising:
(a) heating the polymer solution to a temperature at which the solvent evaporates in the evaporation zone of (b) of from about 38.5° to about 200° C. by passing the solution through a heating zone; and
(b) passing the heated polymer solution of (a) through at least one orifice located in an evaporation zone, said evaporation zone containing prior to passage of the polymer solution therein a saturated atmosphere of methylene chloride vapor at atmospheric pressure and at a temperature of the boiling point of the solvent, and having an exit orifice for said vapor, to produce a polymer solution having a final polymer concentration of from about 15 to about 30%, by weight, based upon the total weight of the polymer solution.

23. The process of claim 22 wherein the polymer solution of (a) is heated to a temperature of about 50° to about 190° C.

24. The process of claim 14 wherein the polymer solution of (a) is heated to a temperature of about 170° to about 190° C.

25. The process of claim 22 wherein said halogenated aromatic polyester of the recurring structural formula is the product of tetrabromobisphenol A and a mixture of about 45 to about 75% by weight isophthaloyl chloride and correspondingly about 55 to about 25% by weight terephthaloyl chloride.

26. The process of claim 22 wherein said halogenated aromatic polyester of the recurring structural formula is a product of tetrabromobisphenol A and a mixture of about 60% by weight isophthaloyl chloride and correspondingly about 40% by weight terephthaloyl chloride.

27. The process of claim 22 wherein said halogenated aromatic polyester of the recurring strctural formula is a product of tetrachlorobosphenol A and a mixture of about 90 to about 40% by weight isophthaloyl chloride and correspondingly about 10 to 40% by weight terephthaloyl chloride.

28. The process of claim 22 wherein said halogenated aromatic polyester of the recurring structural formula is a product of tetrachlorobisphenol A and a mixture of about 70% by weight isophthaloyl chloride and correspondingly about 30% by weight terephthaloyl chloride.

29. The process of claim 22 wherein R and R' may contain from 1 to about 5 carbon atoms and wherein n may be from about 40 to about 400.

30. The process of claim 22 wherein part of the concentrated solution of the halogenated aromatic polyester solution of (b) is mixed with the unconcentrated solution of (a) prior to passage of said mixture through the heating zone.

31. A continuous process for concentrating, in the substantial absence of gel formation, a solution of the condensation product of tetrabromobisphenol A with a mixture of from about 55 to about 25% by weight terephthaloyl chloride and from about 45 to about 75% by weight isophthaloyl chloride dissolved in methylene chloride, said solution having an initial polymer concentration of from about 7 to about 15% by weight, said process comprising:
(a) heating the polymer solution to a temperature of from about 50° to about 190° C. by passing the solution through a heating zone;
(b) passing the heated polymer solution of (a) through at least one orifice located in an evaporation zone, said evaporation zone containing prior to passage of the polymer solution therein a saturated atmosphere of methylene chloride vapor at atmospheric pressure at a temperature of the boiling point of the solvent, and having an exit orifice for said vapor, to produce a polymer solution having a final polymer concentration of from about 19 to about 22%, by weight, based upon the total weight of the polymer solution; and (c) admixing part of said concentrated polymer solution of (b) with the unconcentrated polymer solution of (a) prior to passage of the resulting mixture through the heating zone.

32. The process of claim 7 wherein the temperature of the vapor in the evaporation zone is from about 10° to about 200° C. less than the temperature of the heated polymer solution of (a).

* * * * *